3,086,013
2-FORMYL-Δ²-CORTICOIDS
Albert Bowers and James C. Orr, Mexico City, Mexico, assignors, by mesne assignments, to Syntex Corporation, a corporation of Panama
No Drawing. Filed Sept. 15, 1961, Ser. No. 138,267
26 Claims. (Cl. 260—239.55)

The present invention relates to novel cyclopentanophenanthrene derivatives and to a process for the production thereof.

More particularly the present invention relates to 2-formyl-Δ² derivatives of cortical hormones.

The novel compounds of the present invention which are powerful anti-inflammatory agents with low catabolic activities and which also exhibit glycogenic, thymolytic, anti-estrogenic and anti-gonadotropic activities, are represented by the following formulas:

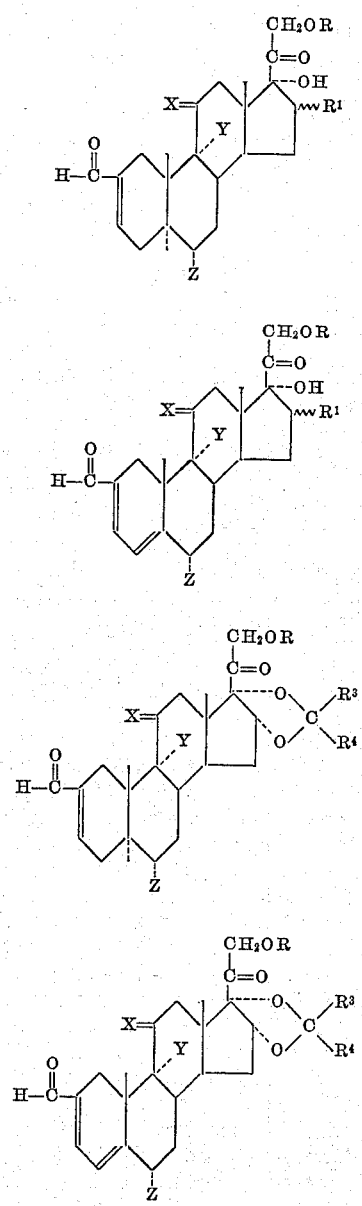

In the above formulas, X represents β-hydroxy or keto; Y represents hydrogen, fluorine or chlorine; Z represents hydrogen, fluorine, chlorine or methyl; $R^1$ represents hydrogen, α-methyl, β-methyl, α-hydroxy or α-hydrocarbon carboxylic acyloxy of less than 12 carbon atoms; and $R^3$ and $R^4$ each represent hydrogen or the residue of a hydrocarbon radical containing up to 8 carbon atoms of straight, branched, cyclic or mixed aliphatic-cyclic chain, saturated or unsaturated and including aromatic groups.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the following equation:

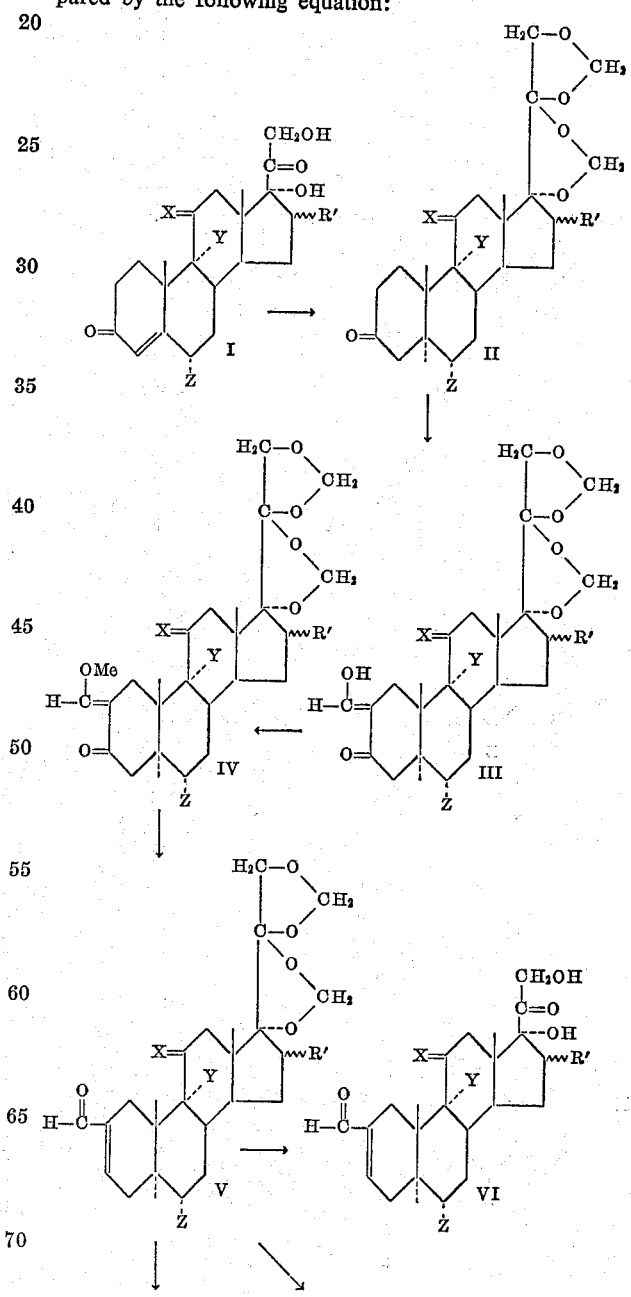

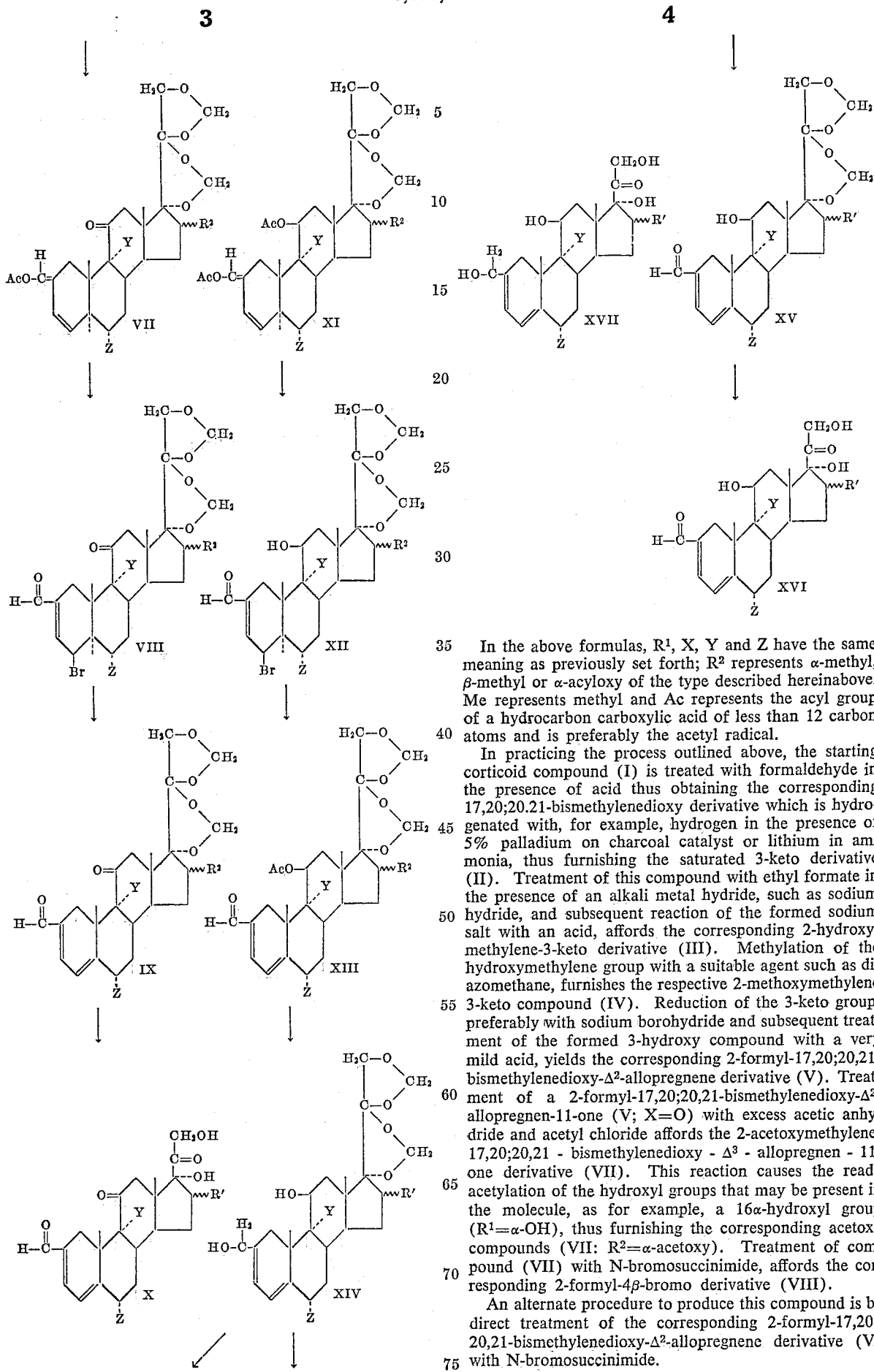

In the above formulas, $R^1$, X, Y and Z have the same meaning as previously set forth; $R^2$ represents α-methyl, β-methyl or α-acyloxy of the type described hereinabove. Me represents methyl and Ac represents the acyl group of a hydrocarbon carboxylic acid of less than 12 carbon atoms and is preferably the acetyl radical.

In practicing the process outlined above, the starting corticoid compound (I) is treated with formaldehyde in the presence of acid thus obtaining the corresponding 17,20;20.21-bismethylenedioxy derivative which is hydrogenated with, for example, hydrogen in the presence of 5% palladium on charcoal catalyst or lithium in ammonia, thus furnishing the saturated 3-keto derivative (II). Treatment of this compound with ethyl formate in the presence of an alkali metal hydride, such as sodium hydride, and subsequent reaction of the formed sodium salt with an acid, affords the corresponding 2-hydroxymethylene-3-keto derivative (III). Methylation of the hydroxymethylene group with a suitable agent such as diazomethane, furnishes the respective 2-methoxymethylene 3-keto compound (IV). Reduction of the 3-keto group, preferably with sodium borohydride and subsequent treatment of the formed 3-hydroxy compound with a very mild acid, yields the corresponding 2-formyl-17,20;20,21-bismethylenedioxy-$\Delta^2$-allopregnene derivative (V). Treatment of a 2-formyl-17,20;20,21-bismethylenedioxy-$\Delta^2$-allopregnen-11-one (V; X=O) with excess acetic anhydride and acetyl chloride affords the 2-acetoxymethylene-17,20;20,21 - bismethylenedioxy - $\Delta^3$ - allopregnen - 11-one derivative (VII). This reaction causes the ready acetylation of the hydroxyl groups that may be present in the molecule, as for example, a 16α-hydroxyl group ($R^1$=α-OH), thus furnishing the corresponding acetoxy compounds (VII: $R^2$=α-acetoxy). Treatment of compound (VII) with N-bromosuccinimide, affords the corresponding 2-formyl-4β-bromo derivative (VIII).

An alternate procedure to produce this compound is by direct treatment of the corresponding 2-formyl-17,20;-20,21-bismethylenedioxy-$\Delta^2$-allopregnene derivative (V) with N-bromosuccinimide.

This derivative upon selective dehydrohalogenation of the 4β-bromo substituent, as for example, with calcium carbonate in dimethylformamide, for a period of time of the order of 5 minutes at reflux temperature, furnishes the respective 2-formyl-Δ$^{2,4}$-pregnadiene derivative (IX). The 16α-acetoxy group that may be present (IX; R$^2$= α-acetoxy) is conventionally saponified with a base to furnish the free 16α-hydroxyl.

Following a second sequence of reaction, a 2-formyl-17,20;20,21 - bismethylenedioxy - Δ$^2$ - allopregnen - 11β-ol compound (V: X=β-OH) upon treatment with excess acetic anhydride and excess acetyl chloride, affords the corresponding 2-acetoxymethylene-17,20;20,21-bismethylenedioxy-Δ$^3$-allopregnen-11β-ol-11-acetate derivative (XI). When there are present in the molecule other hydroxyl groups, such as a 16α-hydroxyl (V: X=β-OH; R$^1$= α-OH), there is obtained the corresponding acetoxy derivative, in this instance the 16α-acetoxy compound (XI; R$^2$=α-acetoxy).

Treatment of compound (XI) with N-bromosuccinimide affords the corresponding 2-formyl-4β-bromo-Δ$^2$-allopregnene derivative (XII), which upon selective dehydrohalogenation such as described hereinabove, furnishes the respective 2-formyl-17,20;20,21-bismethylenedioxy-Δ$^{2,4}$-pregnadien-11β-ol-11-acetate derivative (XIII). Reaction of this compound with lithium aluminum hydride affords the reduction of the formyl group and the hydrolysis of the ester groups present in the molecule, thus yielding the 2-hydroxymethyl-17,20;20,21-bismethylenedioxy-Δ$^{2,4}$-pregnadien-11β-ol compound (XIV). Selective oxidation of the allylic alcohol group with 1.1 molar equivalents of 2,3-dichloro-5,6-dicyano-1,4-benzoquinone at room temperature and for a period of time of the order of 3 hours, furnishes the corresponding 2-formyl-17,20;20,21-bismethylenedioxy - Δ$^{2,4}$ - pregnadien-11β-ol-derivative (XV).

The above described 2-formyl-17,20;20,21-bismethylenedioxy derivatives (V, IX, XV) are hydrolyzed to the corresponding 2-formyl-17α, 21-diol-20-one derivatives (VI, X, XVI) by treatment in an acid medium, as for example 60% formic acid at reflux temperature, for a period of time of the order of 1 hour.

The above mentioned compounds with a primary hydroxyl such as the 21-hydroxyl, and/or a secondary hydroxyl, such as the 16α-hydroxyl group, are conventionally acylated in pyridine with an acylating agent, as for example acetic anhydride or caproic anhydride, furnishing the corresponding C-21-acyloxy or C-21, 16α-diacyloxy derivatives.

The above mentioned compounds with a hydroxyl group at C-16α and at C-17α are converted into the 16α, 17α-cyclic acetal or 16α, 17α-cyclic ketal by reaction with an aldehyde or ketone such as acetone, formaldehyde, paraldehyde, acetaldehyde, benzophenone, acetophenone, methyl ethyl ketone, diethyl ketone and other similar aldehydes and ketones in the presence of an acid catalyst such as perchloric acid or hydrochloric acid.

The following specific examples serve to illustrate but are not intended to limit the scope of the present invention:

Example I

A solution of 5 g. of 16α-methyl-6α-fluoro-Δ$^4$-pregnene-17α,21-diol-3,11,20-trione (Ringold et al. U.S. patent application Serial No. 789,242, filed January 27, 1959) in 40 cc. of 37% aqueous formaldehyde was treated with 0.5 cc. of concentrated hydrochloric acid and the mixture stirred for 48 hours at room temperature. It was then poured into water, the formed precipitate filtered off, washed with water to neutral and dried under vacuum thus affording 16α-methyl-6α-fluoro-17,20;20,21-bismethylenedioxy-Δ$^4$-pregnene-3,11-dione Following the above technique, there were treated the starting compounds listed below furnishing the corresponding products hereinafter set forth:

| Starting compound | Product |
|---|---|
| 16α-methyl-6α,9α-difluoro-Δ$^4$-pregnene-17α,21-diol-3,11,20-trione. | 16α-methyl-6α,9α-difluoro-17,20; 20,21-bismethylenedioxy-Δ$^4$-pregnene-3,11-dione. |
| 16α-methyl-6α-fluoro-9α-chloro-Δ$^4$-pregnene-17α,21-diol-3,11,20-trione. | 16α-methyl-6α-fluoro-9α-chloro-17, 20; 20,21-bismethylenedioxy-Δ$^4$-pregnene-3,11-dione. |
| 16α-methyl-6α-fluoro-Δ$^4$-pregnene-11β,17α,21-triol-3,20-dione. | 16α-methyl-6α-fluoro-17,20; 20,21-bismethylenedioxy-Δ$^4$-pregnen-11β-ol-3-one. |
| 16α-methyl-6α, 9α-difluoro-Δ$^4$-pregnene-11β,17α,21-triol-3,20-dione. | 16α-methyl-6α,9α-difluoro-17,20; 20 21-bismethylenedioxy-Δ$^4$-pregnen-11β-ol-3-one. |
| 16α-methyl-6α-fluoro-9αchloro-Δ$^4$-pregnene-11β,17α,21-triol-3,20-dione. | 16α-methyl-6α-fluoro-9α-chloro-17, 20; 20,21-bismethylenedioxy-Δ$^4$-pregnen-11β-ol-3-one. |
| 16β-methyl-6α,9α-difluoro-Δ$^4$-pregnene-17α,21-diol-3,11,20-trione. | 16β-methyl-6α,9α-difluoro-17,20; 20,21-bismethylenedioxy-Δ$^4$-pregnene-3,11-dione. |
| 16β-methyl-6α,9α-difluoro-Δ$^4$-pregnene-11β,17α,21-triol-3,20-dione. | 16β-methyl-6α,9α-difluoro-17,20; 20,21-bismethylenedioxy-Δ$^4$-pregnen-11β-ol-3-one. |
| 6α,16β-dimethyl-Δ$^4$-pregnen-17α,21-diol-3,11,20-trione. | 6α,16β-dimethyl-17,20; 20,21-bismethylenedioxy-Δ$^4$-pregnene-3,11-dione. |
| 6α,16β-dimethyl-Δ$^4$-pregnene-11β,17α,21-triol-3,20-dione. | 6α,16β-dimethyl-17,20; 20,21-bismethylenedioxy-Δ$^4$-pregnen-11β-ol-3-one. |
| 6α-chloro-9α-fluoro-Δ$^4$-pregnene-16α,17α,21-triol-3,11,20-trione. | 6α-chloro-9α-fluoro-17,20; 20,21-bismethylenedioxy-Δ$^4$-pregnen-16α-ol-3,11-dione. |
| 6α-chloro-9α-fluoro-Δ$^4$-pregnen-11β,16α,21-tetrol-3,20-dione. | 6α-chloro-9α-fluoro-17,20; 20,21-bismethylenedioxy-Δ$^4$-pregnene-11β,16α-diol-3-one. |
| 9α-fluoro-Δ$^4$-pregnen-11β,16α,17α,21-tetrol-3,20-dione. | 9α-fluoro-17,20; 20,21-bismethylenedioxy-Δ$^4$-pregnen-11β,16α-diol-3-one. |
| 9α-fluoro-Δ$^4$-pregnen-16α,17α,21-triol-3,11,20-trione. | 9α-fluoro-17,20; 20,21-bismethylenedioxy-Δ$^4$-pregnen-16α-ol-3,11-dione. |
| Hydrocortisone | 17,20; 20,21-bismethylenedioxy-Δ$^4$-pregnen-11β-ol-3-one. |
| 6α-methyl-16α-hydroxy-hydrocortisone. | 6α-methyl-17,20; 20,21-bismethylenedioxy-Δ$^4$-pregnene-11β,16α-diol-3-one. |

Example II

A solution of 4 g. of 16α-methyl-6α-fluoro-17,20;20,21-bismethylenedioxy-Δ$^4$-pregnene-3,11-dione in 80 cc. of dioxane-ether (1:1) was added in a steady stream to a solution of 0.4 g. of lithium in 400 cc. of anhydrous liquid ammonia with good stirring. At the end of the addition, the blue color was discharged by the addition of 20 g. of ammonium chloride and the ammonia was allowed to evaporate. The product was extracted with ether, washed with water, dried and the ether evaporated to afford a gum which was absorbed from 200 cc. of benzene onto 200 g. of alumina. Elution with benzene-ether afforded a product which upon recrystallization from acetone-hexane gave 16α-methyl-6α-fluoro-17,20;20,21-bismethylenedioxy-allopregnane-3,11-dione.

The starting compounds listed below were treated following the above procedure, thus furnishing the corresponding products hereinafter set forth:

| Starting compound | Product |
|---|---|
| 16α-methyl-6α,9α-difluoro-17, 20; 21,21-bismethylenedioxy-Δ$^4$-pregnene-3,11-dione. | 16α-methyl-6α,9α-difluoro-17,20; 20,21-bismethylenedioxy-allopregnane-3,11-dione. |
| 16α-methyl-6α-fluoro-9α-chloro-17,20; 20,21-bismethylenedioxy-Δ$^4$-pregnene-3,11-dione. | 16α-methyl-6α-fluoro-9α-chloro-17, 20; 20,21-bismethylenedioxy-allopregnane-3,11-dione. |
| 16α-methyl-6α-fluoro-17,20; 20,21-bismethylenedioxy-Δ$^4$-pregnen-11β-ol-3-one. | 16α-methyl-6α-fluoro-17,20; 20,21-bismethylenedioxy-allopregnan-11β-ol-3-one. |
| 16α-methyl-6α,9α-difluoro-17,20; 20,21-bismethylenedioxy-Δ$^4$-pregnen-11β-ol-3-one. | 16α-methyl-6α,9α-difluoro-17,20; 20,21-bismethylenedioxy-allopregnan-11β-ol-3-one. |
| 16α-methyl-6α-fluoro-9α-chloro-17,20; 20,21-bismethylenedioxy-Δ$^4$-pregnen-11β-ol-3-one. | 16α-methyl-6α-fluoro-9α-chloro-17,20; 20,21-bismethylenedioxy-allopregnan-11β-ol-3-one. |
| 16β-methyl-6α, 9α-difluoro-17,20; 20,21-bismethylenedioxy-Δ$^4$-pregnene-3,11-dione. | 16β-methyl-6α,9α-difluoro-17,20; 20,21-bismethylenedioxy-allopregnane-3,11-dione. |
| 16β-methyl-6α,9α-difluoro-17,20; 20,21-bismethylenedioxy-Δ$^4$-pregnen-11β-ol-3-one. | 16β-methyl-6α,9α-difluoro-17,20; 20,21-bismethylenedioxy-allopregnan-11β-ol-3-one. |
| 6α, 16β-dimethyl-17,20; 20,21-bismethylenedioxy-Δ$^4$-pregnene-3,11-dione. | 6α,16β-dimethyl-17,20; 20,21-bismethylenedioxy-allopregnane-3,dione-11. |
| 6α,16β-dimethyl-17,20; 20,21-bismethylenedioxy-Δ$^4$-pregnen-11β-ol-3-one. | 6α,16β-dimethyl-17,20; 20,21-bismethylenedioxy-allopregnan-11β-ol-3-one. |

| Starting compound | Final product |
| --- | --- |
| 6α-chloro-9α-fluoro-17,20; 20,21-bismethylenedioxy-Δ⁴-pregnen-16α-ol-3,11-dione. | 6α-chloro-9α-fluoro-17,20; 20,21-bismethylenedioxy-allopregnan-16α-ol-3,11-dione. |
| 6α-chloro-9α-fluoro-17,20; 20,21-bismethylenedioxy-Δ⁴-pregnene-11β,16α-diol-3-one. | 6α-chloro-9α-fluoro-17,20; 20,21-bismethylenedioxy-allopregnane-11β,16α-diol-3-one. |
| 9α-fluoro-17,20; 20,21-bismethylenedioxy-Δ⁴-pregnene-11β,16α-diol-3-one. | 9α-fluoro-17,20; 20,21-bismethylenedioxy-allopregnane-11β,16α-diol-3-one. |
| 9α-fluoro-17,20; 20,21-bismethylenedioxy-Δ⁴-pregnen-16α-ol-3,11-dione. | 9α-fluoro-17,20; 20,21-bismethylendioxy-allopregnan-16α-ol-3,11-dione. |
| 17,20; 20,21-bismethylenedioxy-Δ⁴-pregnen-11β-ol-3-one. | 17,20; 20,21-bismethylenedioxy-allopregnan-11β-ol-one. |
| 6α-methyl-17,20; 20,21-bismethylenedioxy-Δ⁴-pregnen-11β,16α-diol-3-one. | 6α-methyl-17,20; 20,21-bismethylenedioxy-allopregnane-11β,16α-diol-3-one. |

Example III

To a solution of 3 g. of 16α-methyl-6α-fluoro-17,20; 20,21-bismethylenedioxy-allopregnane-3,11-dione in 60 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous hydrochloric acid and was stirred at room temperature for half an hour. The precipitate was collected, washed with water and dried. Recrystallization from methylene chloride-hexane gave 2-hydroxymethylene16α-methyl-6α-fluoro-17,20;20,21-bismethylenedioxy-allopregnane-3,11-dione.

Following exactly the same procedure, there were treated the starting compounds hereinafter listed, furnishing the corresponding products disclosed below:

| Starting compound | Product |
| --- | --- |
| 16α-methyl-6α,9α-difluoro-17,20; 20,21-bismethylenedioxy-allopregnane-3,11-dione. | 2-hydroxymethylene-16α-methyl-6α,9α-difluoro-17,20; 20,21-bismethylenedioxy-allopregnane-3,11-dione. |
| 16α-methyl-6α-fluoro-9α-chloro-17,20; 20,21-bismethylenedioxy-allopregnane-3,11-dione. | 2-hydroxymethylene-16α-methyl-6α-fluoro-9α-chloro-17,20; 20,21-bismethylenedioxy-allopregnane-3,11-dione. |
| 16α-methyl-6α-fluoro-17,20; 20,21-bismethylenedioxy-allopregnan-11β-ol-3-one. | 2-hydroxymethylene-16α-methyl 6α-fluoro-17,20; 20,21-bismethylenedioxy-allopregnan-11β-ol-3-one. |
| 16α-methyl-6α,9α,difluoro-17,20; 20,21-bismethylenedioxy-allopregnan-11β-ol-3-one. | 2-hydroxymethylene-16α-methyl-6α,9α-difluoro-17,20; 20,21-bismethylenedioxy-allopregnan-11β-ol-3-one. |
| 16α-methyl-6α-fluoro-9α-chloro-17,20; 20,21-bismethylenedioxy-allopregnan-11β-ol-3-one. | 2-hydroxymethylene-16α-methyl-6α-fluoro-9α-chloro-17,20; 20,21-bismethylenedioxy-allopregnan-11β-ol-3-one. |
| 16β-methyl-6α-9α-difluoro-17,20; 20,21-bismethylenedioxy-allopregnane-3,11-dione. | 2-hydroxymethylene-16β-methyl-6α,9α-difluoro-17,20; 20,21-bismethylenedioxy-allopregnane-3,11-dione. |
| 16β-methyl-6α,9α-difluoro-17,20; 20,21-bismethylenedioxy-allopregnan-11β-ol-3-one. | 2-hydroxymethylene-16β-methyl-6α,9α-difluoro-17,20; 20,21-bismethylenedioxy-allopregnan-11β-ol-3-one. |
| 6α,16β-dimethyl-17,20; 20,21-bismethylenedioxy-allopregnane-3,11-dione. | 2-hydroxymethylene-6α,16β-dimethyl-17,20; 20,21-bismethylenedioxy-allopregnane-3,11-dione. |
| 6α,16β-dimethyl-17,20; 20,21-bismethylenedioxy-allopregnan-11β-ol-3-one. | 2-hydroxymethylene-6α,16β-dimethyl-17,20; 20,21-bismethylenedioxy-allopregnan-11β-ol-3-one. |
| 6α-chloro-9α-fluoro-17,20; 20,21-bismethylenedioxy-allopregnan-16α-ol-3,11-dione. | 2-hydroxymethylene-6α-chloro-9α-fluoro-17,20; 20,21-bismethylenedioxy-allopregnan-16α-ol-3,11-dione. |
| 6α-chloro-9α-fluoro-17,20; 20,21-bismethylenedioxy-allopregnane-11β,16α-diol-3-one. | 2-hydroxymethylene-6α-chloro-9α-fluoro-17,20; 20,21-bismethylenedioxy-allopregnane-11β,16α-diol-3-one. |
| 9α-fluoro-17,20; 20,21-bismethylenedioxy-allopregnane-11β,16α-diol-3-one. | 2-hydroxymethylene-9α-fluoro-17,20; 20,21-bismethylenedioxy-allopregnane-11β,16α-diol-3-one. |
| 9α-fluoro-17,20; 20,21-bismethylenedioxy-allopregnan-16α-ol-3,11-dione. | 2-hydroxymethylene-9α-fluoro-17,20; 20,21-bismethylenedioxy-allopregnan-16α-ol-3,11-dione. |
| 17,20; 20,21-bismethylenedioxy-allopregnan-11β-ol-3-one. | 2-hydroxymethylene-17,20; 20,21-bismethylenedioxy-allopregnan-11β-ol-3-one. |
| 6α-methyl-17,20; 20,21-bismethylenedioxy-allopregnane-11β,16α-diol-3-one. | 2-hydroxymethylene-6α-methyl-17,20; 20,21-bismethylenedioxy-allopregnane-11β,16α-diol-3-one. |

Example IV

To a solution of 3 g. of 2-hydroxymethylene-16α-methyl - 6α - fluoro - 17,20;20,21 - bismethylenedioxy-allopregnane-3,11-dione in 50 cc. of methylene chloride, there were added an excess of diazomethane in ether (obtained from nitrosomethylurea) and a few drops of methanol. The reaction mixture was kept at room temperature for 18 hours. The excess reagent was decomposed with acetic acid. The resulting mixture was poured into water, the organic layer washed to neutral and evaporated to dryness. Recrystallization from acetone-hexane afforded 2 - methoxymethylene - 16α - methyl - 6α-fluoro-17,20;20,21-bismethylenedioxy-allopregnane-3,11-dione.

By the same method, there were treated the starting compounds listed below, thus yielding the corresponding products hereinafter disclosed:

| Starting compound | Product |
| --- | --- |
| 2-hydroxymethylene-16α-methyl-6α,9α-difluoro-17,20; 20,21-bismethylenedioxy-allopregnane-3,11-dione. | 2-methoxymethylene-16α-methyl-6α, 9α-difluoro-17,20; 20, 21-bismethylenedioxy-allopregnane-3,11-dione. |
| 2-hydroxymethylene-16α-methyl-6α-fluoro-9α-chloro-17,20; 20,21-bismethylenedioxy-allopregnane-3,11-dione. | 2-methoxymethylene-16α-methyl-6α-fluoro-9α-chloro-17,20; 20,21-bismethylenedioxy allopregnane-3,11-dione. |
| 2-hydroxymethylene-16α-methyl-6α-fluoro-17,20; 20,21-bismethylenedioxy-allopregnan-11β-ol-3-one. | 2-methoxymethylene-16α-methyl-6α-fluoro-17,20; 20,21-bismethylenedioxy-allopregnan-11β-ol-3-one. |
| 2-hydroxymethylene-16α-methyl-6α,9α-difluoro-17,20; 20,21-bismethylenedioxy-allopregnan-11β-ol-3-one. | 2-methoxymethylene-16α-methyl-6α,9α-difluoro-17,20; 20,21-bismethylenedioxy-allopregnan-11β-ol-3-one. |
| 2-hydroxymethylene-16α-methyl-6α-fluoro-9α-chloro-17,20; 20,21-bismethylenedioxy-allopregnan-11β-ol-3-one. | 2-methoxymethylene-16α-methyl-6α-fluoro-9α-chloro-17,20; 20,21-bismethylenedioxy-allopregnan-11β-ol-3-one. |
| 2-hydroxymethylene-16β-methyl-6α,9α-difluoro-17,20; 20,21-bismethylenedioxy-allopregnane-3,11-dione. | 2-methoxymethylene-16β-methyl-6α,9α-difluoro-17,20; 20,21-bismethylenedioxy-allopregnane-3,11-dione. |
| 2-hydroxymethylene-16,-methyl-6α,9α-difluoro-17,20; 20,21-bismethylenedioxy-allopregnan-11β-ol-3-one. | 2-methoxymethylene-16β-methyl-6α,9α-difluoro-17,20; 20,21-bismethylenedioxy-allopregnan-11β-ol-3-one. |
| 2-hydroxymethylene-6α,16β-dimethyl-17,20; 20,21-bismethylenedioxy-allopregnane-3,11-dione. | 2-methoxymethylene-6α,16β-dimethyl-17,20; 20,21-bismethylenedioxy-allopregnane-3,11-dione. |
| 2-hydroxymethylene-6α,16β-dimethyl-17,20; 20,21-bismethylenedioxy-allopregnan-11β-ol-3-one. | 2-methoxymethylene-6α,16β-dimethyl-17,20; 20,21-bismethylenedioxy-allopregnan-11β-ol-3-one. |
| 2-hydroxymethylene-6α-chloro-9α-fluoro-17,20; 20,21-bismethylenedioxy-allopregnan-16α-ol-3,11-dione. | 2-methoxymethylene-6α-chloro-9α-fluoro-17,20; 20,21-bismethylenedioxy-allopregnan-16α-ol-3,11-dione. |
| 2-hydroxymethylene-6α-chloro-9α-fluoro-17,20; 20,21-bismethylenedioxy-allopregnane-11β,16α-diol-3-one. | 2-methoxymethylene-6α-chloro-9α-fluoro-17,20; 20,21-bismethylenedioxy-allopregnane-11β,16α-diol-3-one. |
| 2-hydroxymethylene-9α-fluoro-17,20; 20,21-bismethylenedioxy-allopregnane-11β,16α-diol-3-one. | 2-methoxymethylene-9α-fluoro-17,20; 20,21-bismethylenedioxy-allopregnane-11β,16α-diol-3-one. |
| 2-hydroxymethylene-9α-fluoro-17,20; 20,21-bismethylenedioxy-allopregnan-16α-ol-3,11-dione. | 2-methoxymethylene-9α-fluoro-17,20; 20,21-bismethylenedioxy-allopregnan-16α-ol-3,11-dione. |
| 2-hydroxymethylene-17,20; 20,21-bismethylenedioxy-allopregnan-11β-ol-3-one. | 2-methoxymethylene-17,20; 20,21-bismethylenedioxy-allopregnan-11β-ol-3-one. |
| 2-hydroxymethylene-6α-methyl-17,20; 20,21-bismethylenedioxy-allopregnane-11β,16α-diol-3-one. | 2-methoxymethylene-6α-methyl-17,20; 20,21-bismethylenedioxy-allopregnane-11β,16α-diol-3-one. |

Example V

A solution of 2 g. of sodium borohydride in 5 cc. of water was added to an ice-cooled solution of 2 g. of 2-methoxymethylene - 16α - methyl - 6α - fluoro-17,20;20,21 - bismethylenedioxy - allopregnane - 3,11-dione in 220 cc. of methanol and the mixture was allowed to stand for 16 hours at room temperature. The excess reagent was decomposed by addition of acetic acid, the solution acidified with 5 drops of concentrated hydrochloric acid and stirred at room temperature for 1 hour, then diluted with water. The product was extracted with ethyl acetate, the extract washed with water until neutral, dried and evaporated. The solid residue was purified by crystallization from acetone-hexane to give 2-formyl- 16α-methyl - 6α - fluoro - 17,20;20,21 - bismethylenedioxy-Δ²-allopregnen-11-one.

The starting compounds hereinafter listed were treated following the above technique thus yielding the corresponding products disclosed below:

| Starting compound | Product |
|---|---|
| 2-methoxymethylene-16α-methyl-6α,9α-difluoro-17,20; 20,21-bismethylenedioxy-allopregnane-3,11-dione. | 2-formyl-16α-methyl-6α,9α-difluoro-17,20; 20,21-bismethylenedioxy-Δ²-allopregnen-11-one. |
| 2-methoxymethylene-16α-methyl-6α-fluoro-9α-chloro-17,20;20,21-bismethylenedioxy-allopregnane-3,11-dione. | 2-formyl-16α-methyl-6α-fluoro-9α-chloro-17,20; 20,21-bismethylenedioxy-Δ²-allopregnen-11-one. |
| 2-methoxymethylene-16α-methyl-6α-fluoro-17,20; 20,21-bismethylenedioxy-allopregnan-11β-ol-3-one. | 2-formyl-16α-methyl-6α-fluoro-17,20; 20,21-bismethylenedioxy-Δ²-allopregnan-11β-ol. |
| 2-methoxymethylene-16α-methyl-6α,9α-difluoro-17,20; 20,21-bismethylenedioxy-allopregnan-11β-ol-3-one. | 2-formyl-16α-methyl-6α,9α-difluoro-17,20; 20,21-bismethylenedioxy-Δ²-allopregnen-11β-ol. |
| 2-methoxymethylene-16α-methyl-6α-fluoro-9α-chloro-17,20; 20,21-bismethylenedioxy-allopregnan-11β-ol-3-one. | 2-formyl-16α-methyl-6α-fluoro-9α-chloro-17,20; 20,21-bismethylenedioxy-Δ²-allopregnen-11β-ol. |
| 2-methoxymethylene-16β-methyl-6α,9α-difluoro-17,20; 20,21-bismethylenedioxy-allopregnane-3,11-dione. | 2-formyl-16β-methyl-6α,9α-difluoro-17,20; 20,21-bismethylenedioxy-Δ²-allopregnen-11-one. |
| 2-methoxymethylene-16β-methyl-6α,9α-difluoro-17,20; 20,21-bismethylenedioxy-allopregnan-11β-ol-3-one. | 2-formyl-16β-methyl-6α,9α-difluoro-17,20; 20,21-bismethylenedioxy-Δ²-allopregnen-11β-ol. |
| 2-methoxymethylene-6α,16β-dimethyl-17,20; 20,21-bismethylenedioxy-allopregnane-3,11-dione. | 2-formyl-6α,16β-dimethyl-17,20; 20,21-bismethylenedioxy-Δ²-allopregnen-11-one. |
| 2-methoxymethlene-6α,16β-dimethyl-17,20; 20,21-bismethylenedioxy-allopregnan-11β-ol-3-one. | 2-formyl-6α,16β-dimethyl-17,20; 20,21-bismethylenedioxy-Δ²-allopregnen-11β-ol. |
| 2-methoxymethylene-6α-chloro-9α-fluoro-17,20; 21,21-bismethylenedioxy-allopregnan-16α-ol-3,11-dione. | 2-formyl-6α-chloro-9α-fluoro-17,20; 20,21-bismethylenedioxy-Δ²-allopregnen-16α-ol-11-one. |
| 2-methoxymethylene-6α-chloro-9α-fluoro-17,20; 20,21-bismethylenedioxy-allopregnane-11β,16α-diol-3-one. | 2-formyl-6α-chloro-9α-fluoro-17,20; 20,21-bismethylenedioxy-Δ²-allopregnene-11β,16α-diol. |
| 2-methoxymethylene-9α-fluoro-17,20; 20,21-bismethylenedioxy-allopregnane-11β,16α-diol-3-one. | 2-formyl-9α-fluoro-17,20; 20,21-bismethylenedioxy-Δ²-allopregnene-11β,16α-diol. |
| 2-methoxymethylene-9α-fluoro-17,20; 20,21-bismethylenedioxy-allopregnan-16α-ol-3,11-dione. | 2-formyl-9α-fluoro-17,20; 20,21-bismethylenedioxy-Δ²-allopregnen-16α-ol-11-one. |
| 2-methoxymethlene-17,20; 20,21-bismethylenedioxy-allopregnan-11β-ol-3-one. | 2-formyl-17,20; 20,21-bismethylenedioxy-Δ²-allopregnen-11β-ol-3-one. |
| 2-methoxymethylene-6α-methyl-17,20; 20,21-bismethylenedioxy-allopregnane-11β,16α-diol-3-one. | 2-formyl-6α-methyl-17,20; 20,21-bismethylenedioxy-Δ²-allopregnene-11β,16α-diol-3-one. |

Example VI

A solution of 5 g. of 2-formyl-16α-methyl-6α-fluoro-17,20;20,21-bismethylenedioxy-Δ²-allopregnen-11-one obtained according to Example V, in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium bicarbonate solution and finally with water. There was thus obtained 2-acetoxymethylene-16α-methyl-6α-fluoro-17,20;20,21-bimethylenedioxy - Δ³ - allopregnen-11-one.

Using the same conditions described above, there were treated the starting materials listed below, thus affording the corresponding products hereinafter set forth.

| Starting compounds | Final Products |
|---|---|
| 2-formyl-16α-methyl-6α,9α-difluoro-17,20; 20,21-bismethylenedioxy-Δ²-allopregnen-11-one. | 2-acetoxymethylene-16α-methyl-6α,9α-difluoro-17,20; 20,21-bismethylenedioxy-Δ³-allopregnen-11-one. |
| 2-formyl-16α-methyl-6α-fluoro-9α-chloro-17,20; 20,21-bismethylenedioxy-Δ²-allopregnen-11-one. | 2-acetoxymethylene-16α-methyl-6α-fluoro-9α-chloro-17,20; 20,21-bismethylenedioxy-Δ³-allopregnen-11-one |
| 2-formyl-16α-methyl-17,20; 20,21-bismethylenedioxy-Δ²-allopregnen-11β-ol. | 2-acetoxymethylene-16α-methyl-6α-fluoro-17,20; 20,21-bismethylenedioxy-Δ³-allopregnen-11β-ol-11-acetate. |
| 2-formyl-16α-methyl-6α,9α-difluoro-17,20; 20,21-bismethylenedixoy-Δ²-allopregnen-11β-ol. | 2-acetoxymethylene-16α-methyl-6α,9α-difluoro-17,20; 20,21-bismethylenedioxy-Δ³-allopregnen-11β-ol-11-acetate. |
| 2-formyl-16α-methyl-6α-fluoro-9α-chloro-17,20; 20,21-bismethylenedioxy-Δ²-allopregnen-11β-ol. | 2-α-acetoxymethylene-16α-methyl-6α-fluoro-9α-chloro-17,20; 20,21-bismethylenedioxy-Δ³-allopregnen-11β-ol-11-acetate. |
| 2-formyl-16β-methyl-6α,9α-difluoro-17,20; 20,21-bismethylenedioxy-Δ²-allopregnen-11-one | 2-acetoxymethylene-16β-methyl-6α,9α-difluoro-17,20; 20,21-bismethylenedioxy-Δ³-allopregnen-11-one. |
| 2-formyl-16β-methyl-6α,9α-difluoro-17,20; 20,21-bismethylenedioxy-Δ²-allopregnen-11β-ol. | 2-acetoxymethylene-16β-methyl-6α,9α-difluoro-17,20; 20,21-bismethylenedioxy-Δ³-allopregnen-11β-ol-11-acetate. |
| 2-formyl-6α,16β-dimethyl-17,20; 20,21-bismethylenedioxy-Δ²-allopregnen-11-one. | 2-acetoxymethylene-6α,16β-dimethyl-17,20; 20,21-bismethylenedioxy-Δ³-allopregnen-11-one. |
| 2-formyl-6α,16β-dimethyl-17,20; 20,21-bismethylenedioxy-Δ²-allopregnen-11β-ol. | 2-acetoxymethylene-6α,16β-dimethyl-17,20; 20,21-bismethylenedioxy-Δ³-allopregnen-11β-ol-11-acetate. |
| 2-formyl-6α-chloro-9α-fluoro-17,20; 20,21-bismethylenedioxy-Δ²-allopregnen-16α-ol-11-one. | 2-acetoxymethylene-6α-chloro-9α-fluoro-17,20; 20,21-bismethylenedioxy-Δ³-allopregnen-16α-ol-11-one-16-acetate. |
| 2-formyl-6α-chloro-9α-fluoro-17,20; 20,21-bismethylenedioxy-Δ²-allopregnene-11β, 16α-diol. | 2-acetoxymethylene-6α-chloro-9α-fluoro-17,20; 20,21-bismethylenedioxy-Δ³-allopregnene-11β, 16α-diol-11,16-diacetate. |
| 2-formyl-9α-fluoro,17,20; 20,21-bismethylenedioxy-Δ²-allopregnen-11β, 16α-diol. | 2-acetoxymethylene-9α-fluoro-17,20; 20,21-bismethylenedioxy-Δ³-allopregnene-11β, 16α-diol-11,16-diacetate. |
| 2-formyl-9α-fluoro-17,20; 20,21-bismethylenedioxy-Δ²-allopregnen-16α-ol-11-one. | 2-acetoxymethylene-9α-fluoro-17,20; 20,21-bismethylenedioxy-Δ³-allopregnen-16α-ol-11-one 16-acetate. |
| 2-formyl-17,20; 20,21-bismethylenedioxy-Δ²-allopregnen-11β-ol-3-one. | 2-acetoxymethylene-17,20; 20,21-bismethylenedioxy-Δ³-allopregnen-11β-ol-11-acetate. |
| 2-formyl-6α-methyl-17,20; 20,21-bismethylenedioxy-Δ²-allopregnene-11β,16α-diol-3-one. | 2-acetoxymethylene-6α-methyl-17,20; 20,21-bismethylenedioxy-Δ³-allopregnene-11β,16α-diol-11,16-diacetate. |

Example VII

A solution of 1 g. of 2-acetoxymethylene-16α-methyl-6α-fluoro-17,20;20,21-Δ³-allopregnen-11-one in 20 cc. of dioxane was treated with 1.5 cc. of a 0.5 N perchloric acid solution and then, there was added over a period of 30 minutes 1.1 molar equivalents of N-chlorosuccinimide. The operation was conducted with constant stirring and at 5° C. The resulting mixture was further stirred for 2 hours; water was added, the formed precipitate filtered off and dried. Crystallization from acetone-hexane afforded 2-formyl-16α-methyl-4β-bromo - 6α - fluoro-17,20;20,21-bismethylenedioxy-Δ²-allopregnen-11-one.

1 g. of the above compound was refluxed with 1 g. of calcium carbonate and 50 cc. of dimethylformamide for 5 minutes, the mixture was filtered, the solvent evaporated under reduced pressure and the residue crystallized from acetone-hexane to afford 2-formyl-16α-methyl-6α-fluoro-17,20;20,21-Δ²,⁴-pregnadien-11-one.

The starting compounds listed below were treated following the above technique, furnishing the final products hereinafter disclosed:

| Starting compound | Final product |
|---|---|
| 2-acetoxymethylene-16α-methyl-6α,9α-difluoro-17,20; 20,21-bismethylenedioxy-Δ³-allopregnen-11-one | 2-formyl-16α-methyl-6α,9α-difluoro-17,20; 20,21-bismethylenedioxy-Δ²,⁴-pregnadien-11-one |
| 2-acetoxymethylene-16α-methyl-6α-fluoro-9α-chloro-17,20; 20,21-bismethylenedioxy-Δ³-allopregnen-11-one | 2-formyl-16α-methyl-6α-fluoro-9α-chloro-17,20; 20,21-bismethylenedioxy-Δ²,⁴-pregnadien-11-one |
| 2-acetoxymethylene-16α-methyl-6α-fluoro-17,20; 20,21-bismethylenedioxy-Δ³-allopregnen-11β-ol-11-acetate | 2-formyl-16α-methyl-6α-fluoro-17, 20; 20,21-bismethylenedioxy-Δ²,⁴-pregnadien-11β-ol-acetate |
| 2-acetoxymethylene-16α-methyl-6α,9α-difluoro-17,20; 20,21-bismethylenedioxy-Δ³-allopregnen-11β-ol-11-acetate | 2-formyl-16α-methyl-6α,9α-difluoro-17,20; 20,21-bismethylenedioxy-Δ²,⁴-pregnadien-11β-ol-11-acetate |
| 2-acetoxymethylene-16α-methyl-6α-fluoro-9α-chloro-17,20; 20,21-bismethylenedioxy-Δ³-allopregnen-11β-ol-11-acetate. | 2-formyl-16α-methyl-6α-fluoro-9α-chloro-17,20; 20,21-bismethylenedioxy-Δ²,⁴-pregnadien-11β-ol-11-acetate. |

| Starting compound | Final Product |
|---|---|
| 2-acetoxymethylene-16β-methyl-6α,9α-difluoro-17,20; 20,21-bismethylenedioxy-Δ³-allopregnen-11-one. | 2-formyl-16β-methyl-6α,9α-difluoro-17,20; 20,21-bismethylenedioxy-Δ²,⁴-pregnadien-11-one. |
| 2-acetoxymethylene-16β-methyl-6α,9α-difluoro-17,20; 20,21-bismethylenedioxy-Δ³-allopregnen-11β-ol-11-acetate. | 2-formyl-16β-methyl-6α,9α-difluoro-17,20; 20,21-bismethylenedioxy-Δ²,⁴-pregnadien-11β-ol-11-acetate. |
| 2-acetoxymethylene-6α,16β-dimethyl-17,20; 20,21-bismethylenedioxy-Δ³-allopregnen-11-one. | 2-formyl-6α,16β-dimethyl-17,20; 20,21-bismethylenedioxy-Δ²,⁴-pregnadien-11-one. |
| 2-acetoxymethylene-6α,16β-dimethyl-17,20; 20,21-bismethylenedioxy-Δ³-allopregnen-11β-ol-11-acetate. | 2-formyl-6α,16β-dimethyl-17,20; 20,21-bismethylenedioxy-Δ²,⁴-pregnadien-11β-ol-11-acetate. |
| 2-acetoxymethylene-6α-chloro-9α-fluoro-17,20; 20,21-bismethylenedioxy-Δ³-allopregnen-16α-ol-11-one-16-acetate. | 2-formyl-6α-chloro-9α-fluoro-17,20; 20,21-bismethylenedioxy-Δ²,⁴-pregnadien-16α-ol-11-one-16-acetate. |
| 2-acetoxymethylene-6α-chloro-9α-fluoro-17,20; 20,21-bismethylenedioxy-Δ³-allopregnen-11β,16α-diol-11,16-diacetate. | 2-formyl-6α-chloro-9α-fluoro-17,20; 20,21-bismethylenedioxy-Δ²,⁴-pregnadiene-11β,16α-diol-11,16-diacetate. |
| 2-acetoxymethylene-9α-fluoro-17,20; 20,21-bismethylenedioxy-Δ³-allopregnen-11β,16α-diol-11,16-diacetate. | 2-formyl-9α-fluoro-17,20; 20,21-bismethylenedioxy-Δ²,⁴-pregnadiene-11β,16α-diol-11,16-diacetate. |
| 2-acetoxymethylene-9α-fluoro-17,20; 20,21-bismethylenedioxy-Δ³-allopregnen-16α-ol-11-one-16-acetate. | 2-formyl-9α-fluoro-17,20; 20,21-bismethylenedioxy-Δ²,⁴-pregnadien-16α-ol-11-one-16-acetate. |
| 2-acetoxymethylene-17,20; 20,21-bismethylenedioxy-Δ³-allopregnen-11β-ol-11-acetate. | 2-formyl-17,20; 20,21-bismethylenedioxy-Δ²,⁴-pregnadien-11β-ol-11-acetate. |
| 2-acetoxymethylene-6α-methyl-17,20; 20,21-bismethylenedioxy-Δ³-allopregnene-11β,16α-diol-11,16-diacetate. | 2-formyl-6α-methyl-17,20; 20,21-bismethylenedioxy-Δ²,⁴-pregnadien-11β,16α-diol-11,16-diacetate. |

*Example VIII*

A solution of 1 g. of 2-formyl-16α-methyl-6α-fluoro-17,20;20,21-bismethylenedioxy - Δ²,⁴ - pregnadien-11β-ol-11-acetate in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate; the combined organic solutions upon evaporation yielded a crude material which was purified by crystallization from acetone-hexane, thus giving 2-hydroxymethyl-16α - methyl - 6α - fluoro-17,20;20,21-bismethylenedioxy-Δ²,⁴-pregnadien-11β-ol.

The starting compounds listed below were treated by the same procedure furnishing the products hereinafter set forth:

| Starting compound | Product |
|---|---|
| 2-formyl-16α-methyl-6α,9α-difluoro-17,20; 20,21-bismethylenedioxy-Δ²,⁴-pregnadien-11β-ol-11-acetate. | 2-hydroxymethyl-16α-methyl-6α,9α-difluoro-17,20; 20,21-bismethylenedioxy-Δ²,⁴-pregnadien-11β-ol. |
| 2-formyl-16α-methyl-6α-fluoro-9α-chloro-17,20; 20,21-bismethylenedioxy-Δ²,⁴-pregnadien-11β-ol-11-acetate. | 2-hydroxymethyl-16α-methyl-6α-fluoro-9α-chloro-17,20; 20,21-bismethylenedioxy-Δ²,⁴-pregnadien-11β-ol. |
| 2-formyl-16β-methyl-6α,9α-difluoro-17,20; 20,21-bismethylenedioxy-Δ²,⁴-pregnadien-11β-ol-11-acetate. | 2-hydroxymethyl-16β-methyl-6α,9α-difluoro-17,20; 20,21-bismethylenedioxy-Δ²,⁴-pregnadien-11β-ol. |
| 2-formyl-6α,16β-dimethyl-17,20; 20,21-bismethylenedioxy-Δ²,⁴-pregnadien-11β-ol-11-acetate. | 2-hydroxymethyl-6α,16β-dimethyl-17,20; 20,21-bismethylenedioxy-Δ²,⁴-pregnadien-11β-ol. |
| 2-formyl-6α-chloro-9α-fluoro-17,20; 20,21-bismethylenedioxy-Δ²,⁴-pregnadiene-11β,16α-diol diacetate. | 2-hydroxymethyl-6α-chloro-9α-fluoro-17,20; 20,21-bismethylenedioxy-Δ²,⁴-pregnadien-11β,16α-diol. |
| 2-formyl-9α-fluoro-17,20; 20,21-bismethylenedioxy-Δ²,⁴-pregnadiene-11β,16α-diol diacetate. | 2-hydroxymethyl-9α-fluoro-17,20; 20,21-bismethylenedioxy-Δ²,⁴-pregnadiene-11β,16α-diol. |
| 2-formyl-17,20; 20,21-bismethylenedioxy-Δ²,⁴-pregnadien-11β-ol-11-acetate. | 2-hydroxymethyl-17,20; 20,21-bismethylenedioxy-Δ²,⁴-pregnadien-11β-ol. |

*Example IX*

A mixture of 1 g. of 2-hydroxymethyl-16α-methyl-6α-fluoro-17,20;20,21-bismethylenedioxy - Δ²,⁴ - pregnadien-11β-ol in 20 cc. of dioxane, and 1.1 molar equivalents of 2,3-dichloro-5,6-dicyano - 1,4 - benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 2-formyl-16α-methyl-6α-fluoro-17,20;20,21-bismethylenedioxy-Δ²,⁴-pregnadien-11β-ol.

Following the above technique, there were treated the starting compounds listed below, thus affording the products indicated hereafter:

| Starting compound | Product |
|---|---|
| 2-hydroxymethyl-16α-methyl-6α,9α-difluoro-17, 20; 20, 21- bismethylenedioxy-Δ²,⁴-pregnadien-11β-ol. | 2-formyl-16α-methyl-6α,9α-difluoro-17, 20; 20, 21-bismethylenedioxy-Δ²,⁴-pregnadien-11β-ol. |
| 2-hydroxymethyl-16α-methyl-6α-fluoro-9α-chloro-17, 20; 20, 21-bismethylenedioxy-Δ²,⁴-pregnadien-11β-ol. | 2-formyl-16α-methyl-6α-fluoro-9α-chloro-17, 20; 20, 21-bismethylenedioxy-Δ²,⁴-pregnadien-11β-ol. |
| 2-hydroxymethyl-16β-methyl-6α, 9α-difluoro-17, 20; 20, 21-bismethylenedioxy-Δ²,⁴-pregnadien-11β-ol. | 2-formyl-16β-methyl-6α, 9α-difluoro-17, 20; 20, 21-bismethylenedioxy-Δ²,⁴-pregnadien-1β-ol. |
| 2-hydroxymethyl-6α, 16β-dimethyl-17,20; 20, 21-bismethylenedioxy-Δ²,⁴-pregnadien-11β-ol. | 2-formyl-6α, 16β-dimethyl-17, 20; 20, 21-bismethylenedioxy-Δ²,⁴-pregnadien-11β-ol. |
| 2-hydroxymethyl-6α-chloro-9α-fluoro-17, 20; 20, 21-bismethylenedioxy-Δ²,⁴-pregnadiene-11β, 16α-diol. | 2-formyl-6α-chloro-9α-fluoro-17, 20; 20, 21-bismethylenedioxy-Δ²,⁴-pregnadiene-11β, 16α-diol. |
| 2-hydroxymethyl-9α-fluoro-17, 20; 20, 21-bismethylenedioxy-Δ²,⁴-pregnadiene-11β, 16α-diol. | 2-formyl-9α-fluoro-17, 20; 20, 21-bismethylenedioxy-Δ²,⁴-pregnadiene-11β, 16α-diol. |
| 2-hydroxymethyl-17, 20; 20, 21-bismethylenedioxy-Δ²,⁴-pregnadien-11β-ol. | 2-formyl-17, 20; 20, 21-bismethylenedioxy-Δ²,⁴-pregnadien-11β-ol. |

*Example X*

A solution of 1 g. of 2-formyl-6α-chloro-9α-fluoro-17, 20; 20, 21 - bismethylenedioxy-Δ²,⁴-pregnadien-16α-ol-11-one-16-acetate in 50 cc. of methanol was refluxed for 3 hours with 500 mg. of potassium hydroxide dissolved in 1 cc. of water; it was then poured into ice water, the precipitate collected, washed with water to neutral and dried. Recrystallization from methylene chloride-ether afforded 2 - formyl - 6α - chloro-9α-chloro-17,20;20,21-bismethylenedioxy-Δ²,⁴-pregnadien-16α-ol-11-one.

When applying this procedure to 2-formyl-9α-fluoro-17, 20;20,21-bismethylenedioxy-Δ²,⁴-pregnadien - 16α - ol-11-one-16-acetate, there was obtained 2-formyl-9α-fluoro-17, 20;21 - bismethylenedioxy-Δ²,⁴-pregnadien - 16α - ol - 11-one-16-acetate.

*Example XI*

1 g. of 2-formyl - 16α - methyl-6α-fluoro-17,20;20,21-bismethylenedioxy-Δ²-allopregnen-11-one was heated on a steam bath with 20 cc. of 60% formic acid for 20 minutes, cooled, diluted with water and the precipitate was collected, washed with water, dried, and recrystallized from acetone-hexane, thus affording 2-formyl-16α-methyl-6α-fluoro-Δ²-allopregnene-17α,21-diol-11,20-dione.

Upon hydrolysis by the above technique of the starting compounds listed below, there were obtained the corresponding products hereinafter disclosed:

| Starting compound | Product |
|---|---|
| 2-formyl-16α,methyl-6α,9α-difluoro-17,20; 20,21-bismethylenedioxy-Δ²-allopregnen-11-one. | 2-formyl-16α-methyl-6α,9α-difluoro-Δ²-allopregnene-17α,21-diol-11,20-dione. |
| 2-formyl-16α-methyl-6α-fluoro-9α-chloro-17,20; 20,21-bismethylenedioxy-Δ²-allopregnen-11-one. | 2-formyl-16α-methyl-6α-fluoro-9α-chloro-Δ²-allopregnene-17α,21-diol-11,20-dione. |
| 2-formyl-16α-methyl-6α-fluoro-17,20; 20, 21-bismethylenedioxy-Δ²-allopregnen-11β-ol. | 2-formyl-16α-methyl-6α-fluoro-Δ²-allopregnene-11β,17α,21-triol-20-one. |
| 2-formyl-16α-methyl-6α,9α-difluoro-17,20; 20,21-bismethylenedioxy-Δ²-allopregnen-11β-ol. | 2-formyl-16α-methyl-6α,9α-difluoro-Δ²-allopregnen-11β,17α,21-triol-20-one. |
| 2-formyl-16α-methyl-6α-fluoro-9α-chloro-17,20; 20,21-bismethylenedioxy-Δ²-allopregnen-11β-ol. | 2-formyl-16α-methyl-6α-fluoro-9α-chloro-Δ²-allopregnen-11β,17α,21-triol-20-one. |
| 2-formyl-16β-methyl-6α,9α-difluoro-17,20;20,21-bismethylenedioxy-Δ²-allopregnen-11-one. | 2-formyl-16β-methyl-6α,9α-difluoro-Δ²-allopregnene-17α,21-diol-11,20-dione. |

| Starting compound | Product |
|---|---|
| 2-formyl-16β-methyl-6α,9α-difluoro-17,20;20,21-bismethylenedioxy-Δ²-allopregnen-11β-ol. | 2-formyl-16β-methyl-6α,9α-difluoro-Δ²-allopregnene-11β,17α,21-triol-20-one. |
| 2-formyl-6α,16β-dimethyl-17,20;20,21-bismethylenedioxy-Δ²-allopregnen-11-one. | 2-formyl-6α,16β-dimethyl-Δ²-allopregnen-17α,21-diol-11,20-dione. |
| 2-formyl-6α,16β-dimethyl-17,20;20,21-bismethylenedioxy-Δ²-allopregnen-11β-ol. | 2-formyl-6α,16β-dimethyl-Δ²-allopregnene-11β,17α,21-triol-20-one. |
| 2-formyl-6α-chloro-9α-fluoro-17,20;20,21-bismethylenedioxy-Δ²-allopregnen-16α-ol-11-one. | 2-formyl-6α-chloro-9α-fluoro-Δ²-allopregnene-16α,17α,21-triol-11,20-dione. |
| 2-formyl-6α-chloro-9α-fluoro-17,20;20,21-bismethylenedioxy-Δ²-allopregnene-11β,16α-diol. | 2-formyl-6α-chloro-9α-fluoro-Δ²-allopregnene-11β,16α,17α,21-tetrol-20-one. |
| 2-formyl-9α-fluoro-17,20;20,21-bismethylenedioxy-Δ²-allopregnene-11β,16α-diol. | 2-formyl-9α-fluoro-Δ²-allopregnene-11β,16α,17α,21-tetrol-20-one. |
| 2-formyl-9α-fluoro-17,20;20,21-bismethylenedioxy-Δ²-allopregnen-16α-ol-11-one. | 2-formyl-9α-fluoro-Δ²-allopregnen-16α,17α,21-triol-11,20-dione. |
| 2-formyl-17,20; 20,21-bismethylenedioxy-Δ²-allopregnen-11β-ol-3-one. | 2-formyl-Δ²-allopregnene-11β,17α,21-triol-20-one. |
| 2-formyl-6α-methyl-17,20; 20,21-bismethylenedioxy-Δ²-allopregnene-11β,16α-diol-3-one. | 2-formyl-6α-methyl-Δ²-allopregnene-11β,16α,17α,21-tetrol-20-one. |
| 2-formyl-16α-methyl-6α,9α-difluoro-17,20; 20,21-bismethylenedioxy-Δ²,⁴-pregnadien-11β-ol. | 2-formyl-16α-methyl-6α,9α-difluoro-Δ²,⁴-pregnadiene-11β,17α,21-triol-20-one. |
| 2-formyl-16α-methyl-6α-fluoro-9α-chloro-17,20; 20,21-bismethylenedioxy-Δ²,⁴-pregnadien-11β-ol. | 2-formyl-16α-methyl-6α-fluoro-9α-chloro-Δ²,⁴-pregnadien-11β,17α,21-triol-20-one. |
| 2-formyl-16β-methyl-6α,9α-difluoro-17,20; 20,21-bismethylenedioxy-Δ²,⁴-pregnadien-11β-ol. | 2-formyl-16β-methyl-6α,9α-difluoro-Δ²,⁴-pregnadiene-11β,17α,21-triol-20-one. |
| 2-formyl-6α,16β-dimethyl-17,20; 20,21-bismethylenedioxy-Δ²,⁴-pregnadien-11β-ol. | 2-formyl-6α,16β-dimethyl-Δ²,⁴-pregnadiene-11β,17α,21-triol-20-one. |
| 2-formyl-6α-chloro-9α-fluoro-17,20; 20,21-bismethylenedioxy-Δ²,⁴-pregnadiene-11β,16α-diol. | 2-formyl-6α-chloro-9α-fluoro-Δ²,⁴-pregnadiene-11β,16α,17α,21-tetrol-20-one. |
| 2-formyl-9α-fluoro-17,20; 20,21-bismethylenedioxy-Δ²,⁴-pregnadiene-11β,16α-diol. | 2-formyl-9α-fluoro-Δ²,⁴-pregnadiene-11β,16α,17α,21-tetrol-20-one. |
| 2-formyl-17,20; 20,21-bismethylenedioxy-Δ²,⁴-pregnadien-11β-ol. | 2-formyl-Δ²,⁴-pregnadiene-11β,17α,21-triol-20-one. |
| 2-formyl-16α-methyl-6α-fluoro-17,20; 20,21-bismethylenedioxy-Δ²,⁴-pregnadien-11β-ol. | 2-formyl-16α-methyl-6α-fluoro-Δ²,⁴-pregnadiene-11β,17α,21-triol-20-one. |
| 2-formyl-16α-methyl-6α-fluoro-9α-chloro-17,20; 20,21-bismethylenedioxy-Δ²,⁴-pregnadiene-11-one. | 2-formyl-16α-methyl-6α-fluoro-9α-chloro-Δ²,⁴-pregnadiene-17α,21-diol-11,20-dione. |
| 2-formyl-16α-methyl-6α,9α-difluoro-17,20; 20,21-bismethylenedioxy-Δ²,⁴-pregnadiene-11-one. | 2-formyl-16α-methyl-6α,9α-difluoro-Δ²,⁴-pregnadiene-17α,21-diol-11,20-dione. |
| 2-formyl-16β-methyl-6α,9α-difluoro-17,20; 20,21-bismethylenedioxy-Δ²,⁴-pregnadiene-11-one. | 2-formyl-16β-methyl-6α,9α-difluoro-Δ²,⁴-pregnadiene-17α,21-diol-11,20-dione. |
| 2-formyl-6α,16β-dimethyl-17,20; 20,21-bismethylenedioxy-Δ²,⁴-pregnadien-11-one. | 2-formyl-6α,16β-dimethyl-Δ²,⁴-pregnadiene-17α,21-diol-11,20-dione. |
| 2-formyl-6α-chloro-9α-fluoro-17,20; 20,21-bismethylenedioxy-Δ²,⁴-pregnadien-16α-ol-11-one. | 2-formyl-6α-chloro-9α-fluoro-Δ²,⁴-pregnadien-16α,17α,21-triol-11,20-dione. |
| 2-formyl-9α-fluoro-17,20; 20,21-bismethylenedioxy-Δ²,⁴-pregnadien-16α-ol-11-one. | 2-formyl-9α-fluoro-Δ²,⁴-pregnadien-16α,17α,21-triol-11,20-dione. |
| 2-formyl-16α-methyl-6α-fluoro-17,20; 20,21-bismethylenedioxy-Δ²,⁴-pregnadien-11-one. | 2-formyl-16α-methyl-6α-fluoro-Δ²,⁴-pregnadien-17α,21-diol-11,20-dione. |

*Example XII*

A mixture of 1 g. of 2-formyl-16α-methyl-6α-fluoro-Δ²-allopregnene-17α,21-diol-11,20-dione, 10 cc. of pyridine and 2 g. of acetic anhydride was kept overnight at room temperature. It was then poured into cold water, the formed precipitate filtered off, washed and dried. Recrystallization from acetone-hexane afforded the 21-acetate of 2-formyl-16α-methyl-6α-fluoro-Δ²-allopregnene-17α,21-diol-11,20-dione.

Following exactly the above technique, there were treated the final products obtained in the preceding example, thus furnishing the products hereinafter set forth:

FINAL PRODUCTS 21-acetate of 2-formyl-16α-methyl-6α,9α-difluoro-Δ²-allopregnene-17α,21-diol-11,20-dione.
21-acetate of 2-formyl-16α-methyl-6α-fluoro-9α-chloro-Δ²-allopregnene-17α,21-diol-11,20-dione.
21-acetate of 2-formyl-16α-methyl-6α-fluoro-Δ²-allopregnene-11β,17α,21-triol-20-one.
21-acetate of 2-formyl-16α-methyl-6α,9α-difluoro-Δ²-allopregnene-11β,17α,21-triol-20-one.
21-acetate of 2-formyl-16α-methyl-6α-fluoro-9α-chloro-Δ²-allopregnene-11β,17α,21-triol-20-one.
21-acetate of 2-formyl-16β-methyl-6α,9α-difluoro-Δ²-allopregnene-17α,21-diol-11,20-dione.
21-acetate of 2-formyl-16β-methyl-6α,9α-difluoro-Δ²-allopregnene-11β,17α,21-triol-20-one.
21-acetate of 2-formyl-6α,16β-dimethyl-Δ²-allopregnen-17α,21-diol-11,20-dione.
21-acetate of 2-formyl-6α,16β-dimethyl-Δ²-allopregnene-11β,17α,21-triol-20-one.
16,21-diacetate of 2-formyl-6α-chloro-9α-fluoro-Δ²-allopregnene-16α,17α,21-triol-11,20-dione.
16,21-diacetate of 2-formyl-6α-chloro-9α-fluoro-Δ²-allopregnene-11β,16α,17α,21-tetrol-20-one.
16,21-diacetate of 2-formyl 9α-fluoro-Δ²-allopregnene-11β,16α,17α,21-tetrol-20-one.
16,21-diacetate of 2-formyl-9α-fluoro-Δ²-allopregnen-16α,17α,21-triol-11,20-dione.
21-acetate of 2-formyl-Δ²-allopregnene-11β,17α,21-triol-20-one.
16,21-diacetate of 2-formyl-6α-methyl-Δ²-allopregnene-11β,16α,17α,21-tetrol-20-one.
21-acetate of 2-formyl-16α-methyl-6α,9α-difluoro-Δ²,⁴-pregnadiene-11β,17α,21-triol-20-one.
21-acetate of 2-formyl-16α-methyl-6α-fluoro-9α-chloro-Δ²,⁴-pregnadien-11β,17α,21-triol-20-one.
21-acetate of 2-formyl-16β-methyl-6α,9α-difluoro-Δ²,⁴-pregnadiene-11β,17α,21-triol-20-one.
21-acetate of 2-formyl-6α,16β-dimethyl-Δ²,⁴-pregnadiene-11β,17α,21-triol-20-one.
16,21-diacetate of 2-formyl-6α-chloro-9α-fluoro-Δ²,⁴-pregnadiene-11β,16α,17α,21-tetrol-20-one.
16,21-diacetate of 2-formyl-9α-fluoro-Δ²,⁴-pregnadiene-11β,16α,17α,21-tetrol-20-one.
21-acetate of 2-formyl-Δ²,⁴-pregnadiene-11β,17α,21-triol-20-one.
21-acetate of 2-formyl-16α-methyl-6α-fluoro-Δ²,⁴-pregnadiene-11β,17α,21-triol-20-one.
21-acetate of 2-formyl-16α-methyl-6α-fluoro-9α-chloro-Δ²,⁴-pregnadiene-17α,21-diol-11,20-dione.
21-acetate of 2-formyl-16α-methyl-6α,9α-difluoro-Δ²,⁴-pregnadiene-17α,21-diol-11,20-dione.
21-acetate of 2-formyl-16β-methyl-6α,9α-difluoro-Δ²,⁴-pregnadiene-17α,21-diol-11,20-dione.
21-acetate of 2-formyl-6α,16β-dimethyl-Δ²,⁴-pregnadiene-17α,21-diol-11,20-dione.
16,21-diacetate of 2-formyl-6α-chloro-9α-fluoro-Δ²,⁴-pregnadiene-16α,17α,21-triol-11,20-dione.
16,21-diacetate of 2-formyl-9α-fluoro-Δ²,⁴-pregnadiene-16α,17α,21-triol-11,20-dione.
21-acetate of 2-formyl-16α-methyl-6α-fluoro-Δ²,⁴-pregnadiene-17α,21-diol-11,20-dione.

*Example XIII*

Using exactly the same conditions described in Example XII, except that acetic anhydride was substituted by propionic anhydride, caproic anhydride, cyclopentylpropionic anhydride and benzoyl chloride, there were obtained respectively the corresponding propionates, caproates, cyclopentylpropionates and benzoates of the above mentioned starting compounds of Example XII.

*Example XIV*

To 120 cc. of acetone containing 1 g. of 2-formyl-6α-chloro-9α-fluoro-Δ²-allopregnene-16α,17α,21-triol-11,20-dione, produced in Example XI, were added 30 drops of 78% perchloric acid. After 1 hour at room temperature 30 drops of pyridine were added and the resulting solution was evaporated to dryness under reduced pressure. There were then added 30 cc. of water to the residue and it was then extracted several times with 80 cc. of ethyl acetate. The combined extracts were washed to neutrality with water, dried over sodium sulfate and evaporated to dryness. The residue upon trituration with methanol gave a crude 16,17-acetonide. Recrystallizations from the same solvent furnished the acetonide of 2-formyl - 6α-chloro-9α-fluoro-Δ² - allopregnene-16α,17α, 21-triol-11,20-dione.

By following the same procedure, there were treated the starting products listed below and there were obtained the corresponding products hereinafter disclosed:

| Starting compounds | Final Products |
|---|---|
| 2-formyl-6α-chloro-9α-fluoro-Δ²-allopregnene-11β, 16α, 17α, 21-tetrol-20-one. | The acetonide of 2-formyl-6α-chloro-9α-fluoro-Δ²-allopregnene-11β, 16α, 17α, 21-tetrol-20-one. |
| 2-formyl-9α-fluoro-Δ²-allopregnene-11β, 16α, 17α, 21-tetrol-20-one. | The acetonide of 2-formyl-9α-fluoro-Δ²-allopregnene-11β, 16α, 17α, 21-tetrol-20-one. |
| 2-formyl-9α-fluoro-Δ²-allopregnene-16α, 17α, 21-triol-11, 20-dione. | The acetonide of 2-formyl-9α-fluoro-Δ²-allopregnene-16α, 17α, 21-triol-11, 20-dione. |
| 2-formyl-6α-chloro-9α-fluoro-Δ²,⁴-pregnadiene-11β, 16α, 17α, 21-tetrol-20-one. | The acetonide of 2-formyl-6α-chloro-9α-Δ²,⁴-pregnadiene-11β, 16α, 17α, 21-tetrol-20-one. |

| Starting compounds | Final products |
|---|---|
| 2-formyl-9α-fluoro-Δ²,⁴-pregnadiene-11β, 16α, 17α, 21-tetrol-20-one. | The acetonide of 2-formyl-9α-fluoro-Δ²,⁴-pregnadiene-11β, 16α, 17α, 21-tetrol-20-one. |
| 2-formyl-6α-chloro-9α-fluoro-Δ²,⁴-pregnadiene-16α, 17α, 21-triol-11, 20-dione. | The acetonide of 2-formyl-6α-chloro-9α-fluoro-Δ²,⁴-pregnadiene-16α, 17α, 21-triol-11,20-dione. |
| 2-formyl-9α-fluoro-Δ²,⁴-pregnadiene-16α, 17α, 21-triol-11-20-dione. | The acetonide of 2-formyl-9α-fluoro-Δ²,⁴-pregnadiene-16α, 17α, 21-triol-11, 20-dione. |
| 2-formyl-6α-methyl-Δ²-allopregnene-11β, 16α, 17α, 21-tetrol-20-one. | The acetonide of 2-formyl-6α-methyl-Δ²-allopregnene-11β, 16α, 17α, 21-tetrol-20-one. |

*Example XV*

Using the same procedure described in Example XIV except that acetone was substituted by benzaldehyde, cyclohexanone and paraformaldehyde, there were obtained respectively the corresponding 16α,17α-benzylidenedioxy, 16α, 17α-cyclohexanone ketal and 16α,17α-methylenedioxy derivatives of the starting compounds of Example XIV.

*Example XVI*

The final products described in Examples XIV and XV were converted into the corresponding 21-acetates, 21-propionates, 21-caproates, 21-cyclopentylpropionates and 21-benzoates in accordance with the methods described in Examples XII and XIII.

We claim:
1. A compound of the following formula:

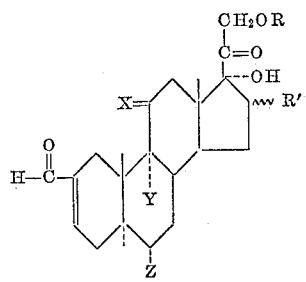

wherein R is selected from the group consisting of hydrogen and a hydrocarbon carboxylic acyl group of less than 12 carbon atoms; $R^1$ is a member of the group consisting of hydrogen, α-methyl-β-methyl, α-hydroxyl, and a hydrocarbon carboxylic acyloxy group of less than 12 carbon atoms; X is selected from the group consisting of keto and β-hydroxyl; Y is selected from the group consisting of hydrogen, fluorine and chlorine, and Z is selected from the group consisting of hydrogen, fluorine, chlorine and methyl.

2. 2 - formyl - 16α-methyl-6α-fluoro-Δ²-allopregnene-17α,21-diol-11,20-dione.
3. 2 - formyl-16α-methyl-6α,9α-difluoro-Δ² - allopregnene-17α,21-diol-11,20-dione.
4. 2 - formyl-16α-methyl-6α-fluoro-9α-chloro - Δ²-allopregnene-17α,21-diol-11,20-dione.
5. 2 - formyl - 16α-methyl-6α,9α-difluoro-Δ²-allopregnene-11β,17α,21-triol-20-one.
6. 2 - formyl - 16α-methyl-6α-fluoro-9α-chloro-Δ²-allopregnene-11β,17α,21-triol-20-one.
7. 2 - formyl - 16β-methyl-6α,9α-difluoro-Δ²-allopregnene-11β,17α,21-triol-20-one.
8. 2 - formyl - 16β-methyl-6α,9α-difluoro-Δ²-allopregnene-17α,21-diol-11,20-dione.
9. 2 - formyl - 6α,16β-dimethyl-Δ²-allopregnene-17α,21-diol-11,20-dione.
10. 2 - formyl - 6α,16β-dimethyl-Δ²-allopregnene-11β, 17α,21-triol-20-one.
11. 2 - formyl - 6α-chloro-9α-fluoro-Δ²-allopregnene-16α,17α,21-triol-11,20-dione.
12. 2 - formyl - 6α-chloro-9α-fluoro-Δ²-allopregnene-11β,16α,17α,21-tetrol-20-one.
13. A compound of the following formula:

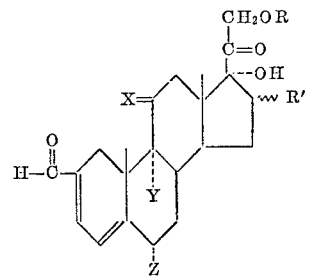

wherein R is selected from the group consisting of hydrogen and a hydrocarbon carboxylic acyl group of less than 12 carbon atoms; $R^1$ is a member of the group consisting of hydrogen, α-methyl, β-methyl, α-hydroxyl, and an α-hydrocarbon carboxylic acyl group of less than 12 carbon atoms; X is selected from the group consisting of keto and β-hydroxyl; Y is selected from the group consisting of hydrogen, fluorine and chlorine; and Z is selected from the group consisting of hydrogen, fluorine, chlorine and methyl.

14. 2 - formyl - 16α-methyl-6α-fluoro-Δ²,⁴-pregnadiene-17α,21-diol-11,20-dione.
15. 2 - formyl - 16α-methyl-6α,9α-difluoro-Δ²,⁴-pregnadiene-17α,21-diol-11,20-dione.
16. 2 - formyl - 16α-methyl-6α-fluoro-9α-chloro-Δ²,⁴-pregnadiene-17α,21-diol-11,20-dione.
17. 2 - formyl - 16α-methyl-6α,9α-difluoro-Δ²,⁴-pregnadiene-11β,17α,21-triol-20-one.
18. 2 - formyl - 16α-methyl-6α-fluoro-9α-chloro-Δ²,⁴-pregnadiene-11β,17α,21-triol-20-one.
19. 2 - formyl - 16β-methyl-6α,9α-difluoro-Δ²,⁴-pregnadiene-11β,17α,21-triol-20-one.
20. 2 - formyl - 16β-methyl-6α,9α-difluoro-Δ²,⁴-pregnadiene-17α,21-diol-11,20-dione.
21. 2 - formyl - 6α,16β-dimethyl-Δ²,⁴-pregnadiene-17α,21-diol-11,20-dione.
22. 2 - formyl - 6α,16β-dimethyl - Δ²,⁴-pregnadiene-11β,17α,21-triol-20-one.
23. 2 - formyl-6α - chloro-9α-fluoro-Δ²,⁴-pregnadiene-16α,17α,21-triol-11,20-dione.
24. 2 - formyl - 6α-chloro-9α-fluoro-Δ²,⁴-pregnadiene-11β,16α,17α,21-tetrol-20-one.
25. A compound of the following formula:

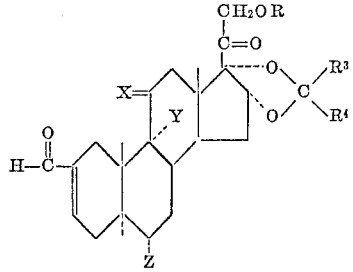

wherein X is selected from the group consisting of keto and β-hydroxyl; Y is selected from the group consisting of hydrogen, fluorine and chlorine; Z is selected from the group consisting of hydrogen, fluorine, chlorine and methyl; R is selected from the group consisting of hydrogen and a hydrocarbon carboxylic acyl group of less than 12 carbon atoms; and $R^3$ and $R^4$ are each selected from the group consisting of hydrogen and a hydrocarbon radical containing up to 8 carbon atoms.

26. A compound of the following formula:

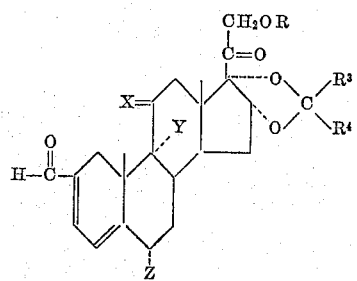

wherein X is selected from the group consisting of keto and β-hydroxyl; Y is selected from the group consisting of hydrogen, fluorine and chlorine; Z is selected from the group consisting of hydrogen, fluorine, chlorine and methyl; R is selected from the group consisting of hydrogen and a hydrocarbon carboxylic acyl group of less than 12 carbon atoms; and $R^3$ and $R^4$ are each selected from the group consisting of hydrogen and a hydrocarbon radical containing up to 8 carbon atoms.

No references cited.